Nov. 28, 1944.    H. A. GRAHAM    2,363,725
CHANGEABLE EXHIBITOR
Filed March 18, 1942    5 Sheets-Sheet 1
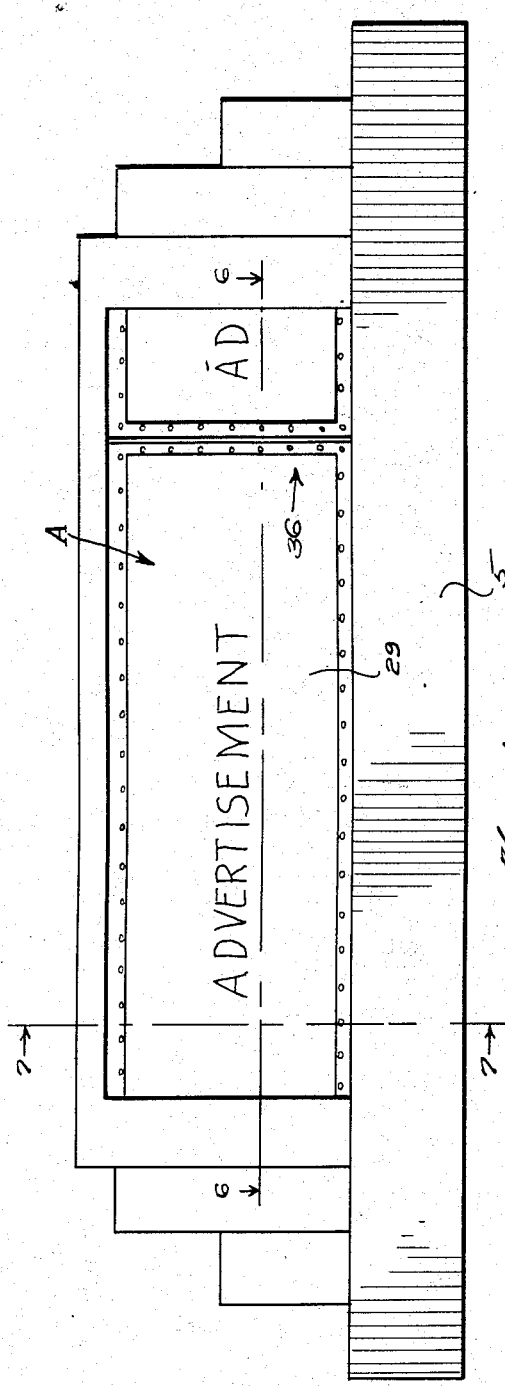
Inventor
HERBERT A. GRAHAM,
By Clarence A. O'Brien
and Harvey B. Jacobson
Attorneys Nov. 28, 1944.  H. A. GRAHAM  2,363,725
CHANGEABLE EXHIBITOR
Filed March 18, 1942  5 Sheets-Sheet 2
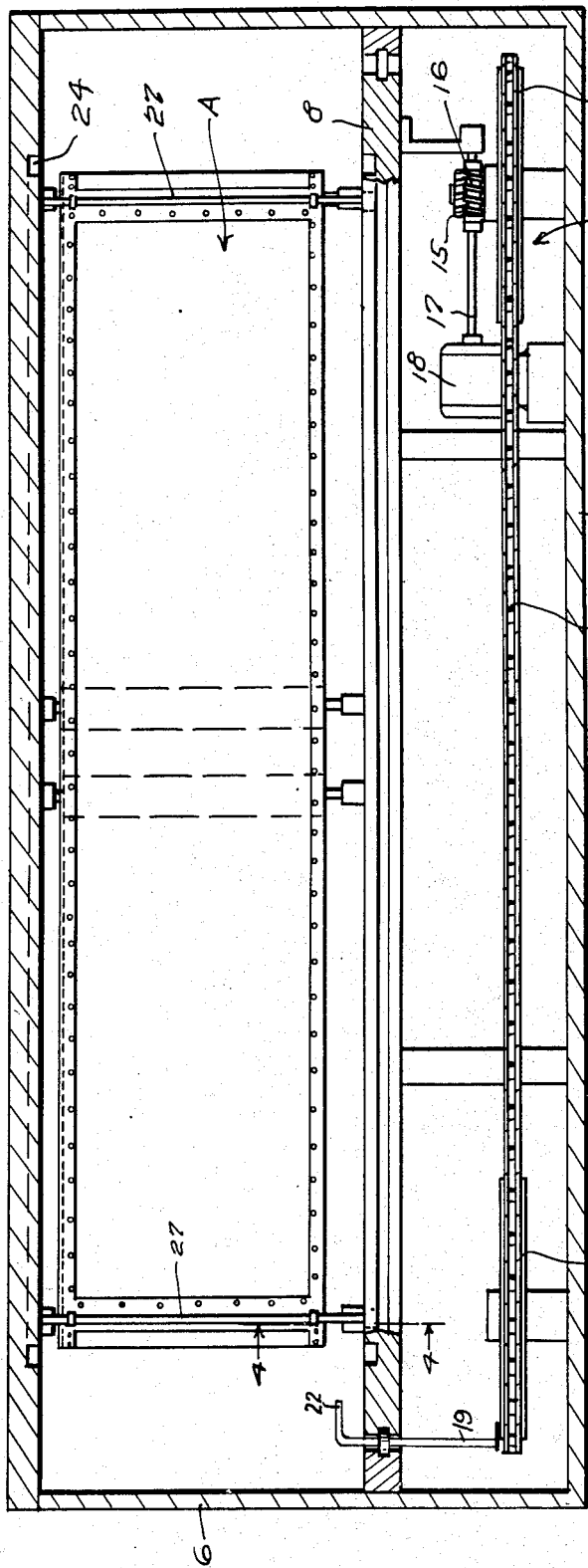
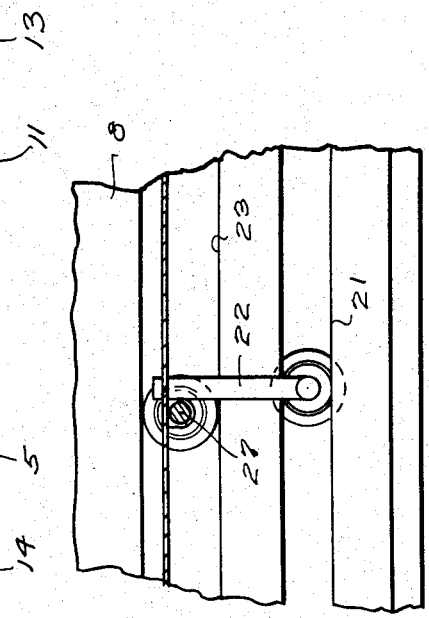
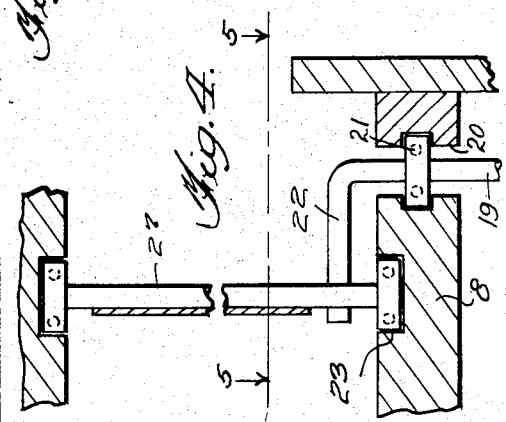
Inventor
HERBERT A. GRAHAM,
By Clarence A. O'Brien
and Harvey B. Jacobson
Attorneys Nov. 28, 1944.  H. A. GRAHAM  2,363,725
CHANGEABLE EXHIBITOR
Filed March 18, 1942   5 Sheets-Sheet 3
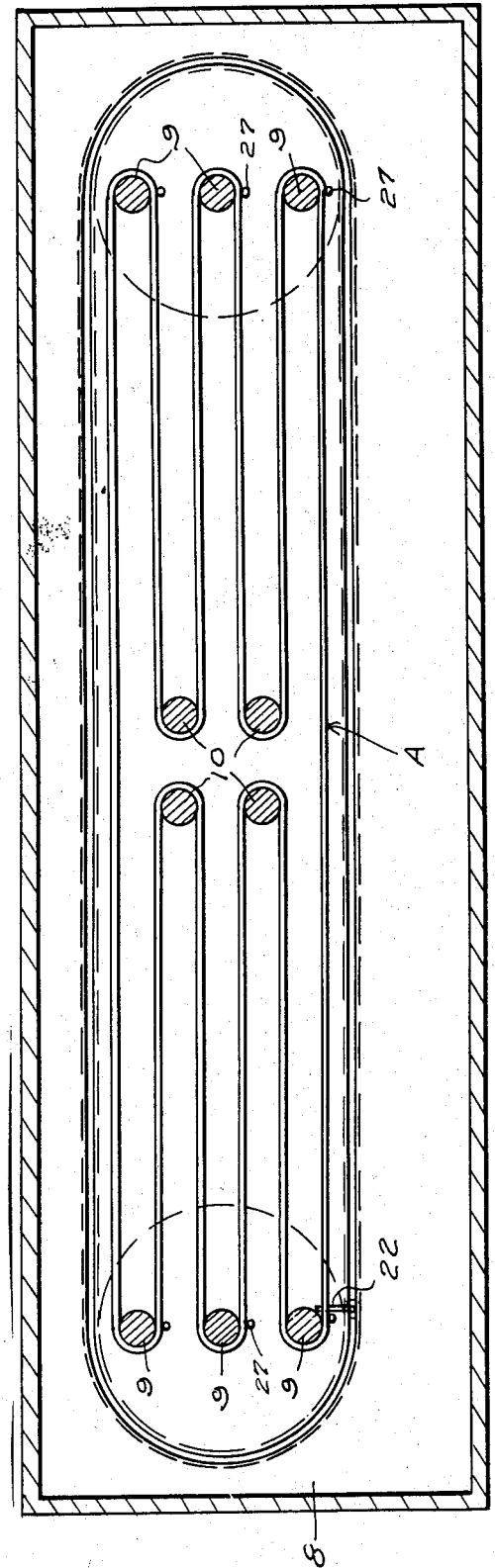
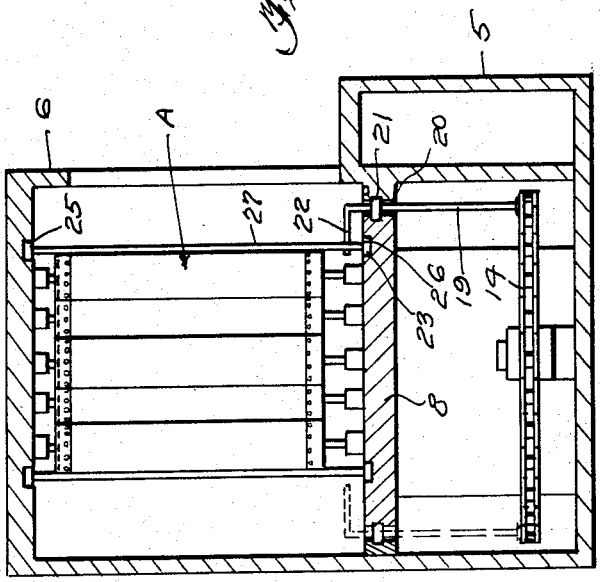
Inventor
HERBERT A. GRAHAM,
By Clarence A. O'Brien
and Harvey B. Jacobson
Attorneys

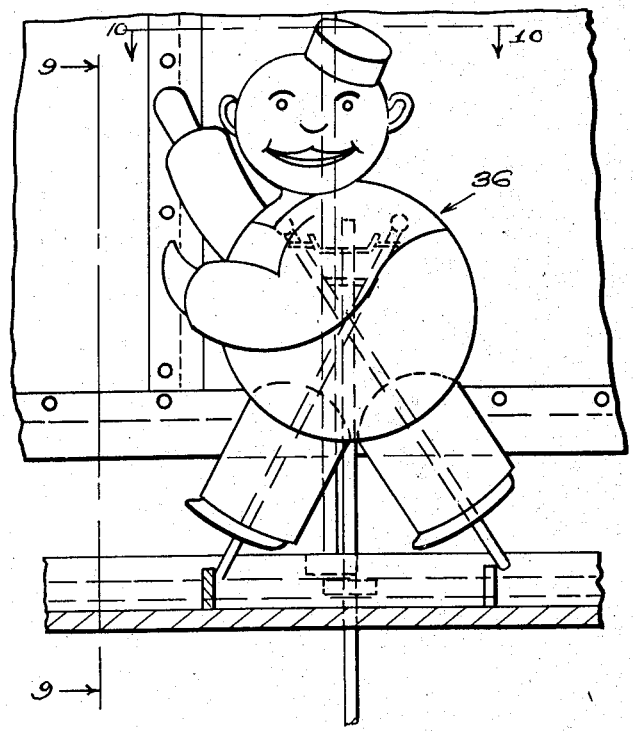
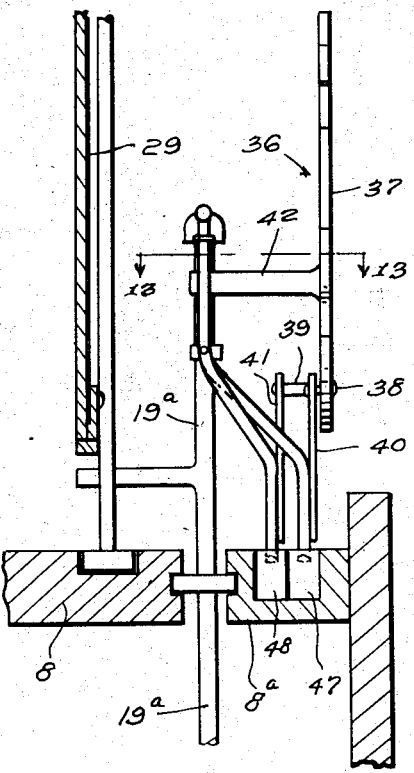
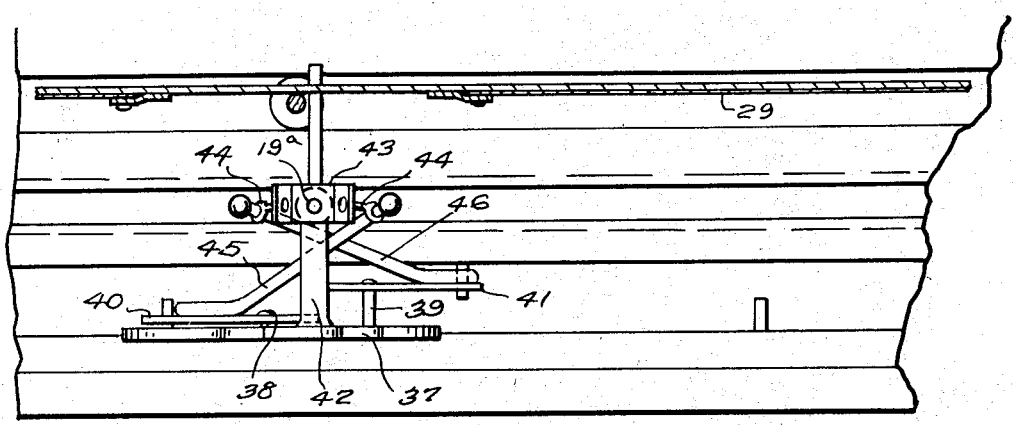

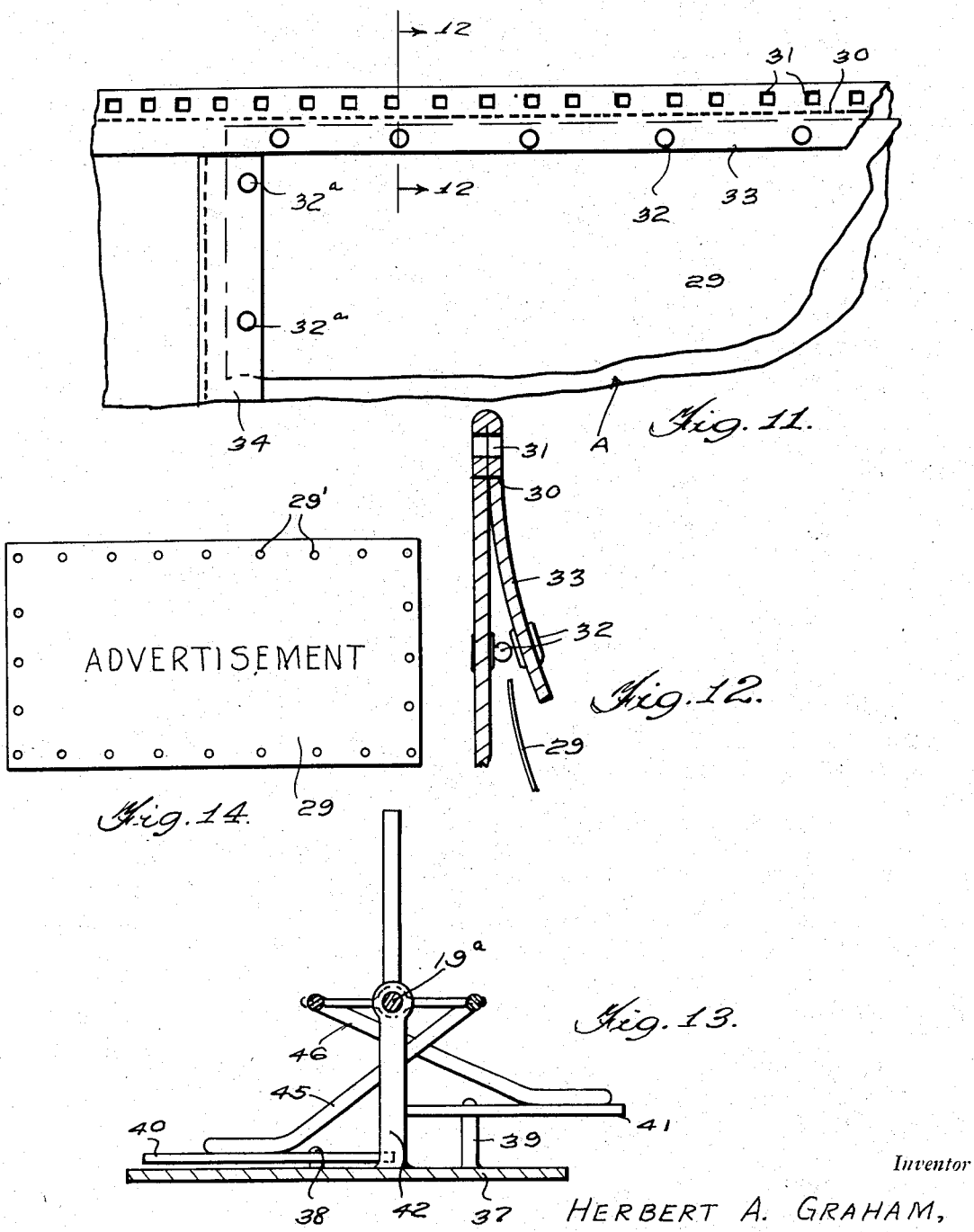

Patented Nov. 28, 1944

2,363,725

UNITED STATES PATENT OFFICE 2,363,725

CHANGEABLE EXHIBITOR

Herbert A. Graham, Goderich, Ontario, Canada

Application March 18, 1942, Serial No. 435,243

6 Claims. (Cl. 40—32)

This invention relates to new and useful improvements in the art of changeable exhibitors and more particularly to an advertising or changeable bulletin board adapted for either indoor or outdoor use.

The principal object of the present invention is to provide a changeable exhibitor, the operating mechanism of which is unusually simple but positive acting in operation.

Another important object of the invention is to provide a changeable exhibitor in conjunction with which an animated figure is employed for the purpose of drawing public attention.

Other important objects and advantages of the invention will become apparent to the reader of the following description.

In the drawings:

Figure 1 represents a front elevational view of the exhibitor.

Figure 2 is a top plan view.

Figure 3 is an enlarged sectional view taken substantially on line 3—3 of Figure 2.

Figure 4 is a fragmentary detailed sectional view taken substantially on line 4—4 of Figure 3.

Figure 5 is a fragmentary detailed sectional view taken substantially on line 5—5 of Figure 4.

Figure 6 is an enlarged horizontal sectional view taken substantially on line 6—6 of Figure 1.

Figure 7 is a vertically sectional view taken substantially on line 7—7 of Figure 1.

Figure 8 is a fragmentary detailed sectional view showing the animated figure attachment in front elevation.

Figure 9 is a vertical section taken substantially on line 9—9 of Figure 8.

Figure 10 is a fragmentary detailed sectional view taken substantially on line 10—10 of Figure 8.

Figure 11 is a fragmentary side elevational view of the exhibitor web.

Figure 12 is a fragmentary detailed enlarged sectional view taken substantially on line 12—12 of Figure 11.

Figure 13 is a section on line 13—13 of Figure 9.

Figure 14 is a plan view of one of the perforated advertising sheets or panels.

Referring to the drawings wherein like numerals designate like parts, it can be seen that numeral 5 denotes an elongated hollow base structure from which rises an elongated housing 7 in which an exhibitor web, generally referred to by numeral A, is operative.

The top portion of the base 5 is divided from the housing 6 by a floor 8.

At each end portion of the floor 8 are preferably three rearwardly spaced and vertically disposed rolls 9, while at an intermediate portion of the floor 8 are preferably four rolls 10, and the web A is trained over these rolls as clearly shown in Figure 6.

Mechanism for driving the web A is shown in Figure 3 and generally referred to by numeral 11 and comprises a pair of sprocket wheels 12, 13, mounted above the bottom of the base 5 and having a sprocket chain 14 trained around the same. The sprocket wheel 13 has a gear 15 which meshes with a worm 16 on a drive shaft 17 operated by an electric motor 18.

As is clearly shown in Figures 4 and 7, a vertically disposed rod 19 has its lower end secured to one link of the sprocket chain 14 and extends upwardly through a slot 20 in the floor 8. This slot is endless extending semi-circularly beyond the rolls 9. The opposed walls of the slot 20 are grooved to accommodate a bearing unit 21 on the rod 19. The upper end of the rod 19 has a laterally disposed arm 22 which extends over an endless channel 23 in the top of the floor 8.

It can now be seen that the underside of the top of the housing 6 has an endless channel 24 overlying the channel 23 in the floor 8 and these channels serve to receive the bearing units 25 and 26 at the upper and lower ends of rods 27 which are vertically disposed across the web A and secured thereto.

At this point a description of the web specifically will be given to bring out the specific location and purpose of the rods 27.

By referring to Figure 13 and also to Figure 14, it can be seen that the web A has its upper and lower edge portions turned over to afford retaining flanges for a sign sheet or card 29. Inwardly of the folded edge portions a reinforcing stitching 30 is provided and between this and the actual edge portion, the web is punched, to afford equidistantly spaced openings 31, to receive ratchet wheels at the upper and lower ends of the rolls 9, 10. Snap fasteners 32 are provided at the free edges of the thus defined flaps 33 for the purpose of holding in place the sign sheets 29 which have been tucked in under the flaps as is suggested in Figures 13 and 14.

Vertically disposed strips 34 are provided at the ends of the sign areas which, of course, will be equivalent to the length of the opening at the front of the housing 6, and these sign sheet-retaining strips 34 are also provided with retaining fasteners 32a of any design desired.

It can now be seen that with the rods 27 thus disposed and located at the vertical strips 34, that is one at each end of a sign area, the rods 27 will be in the path of the arm 22 of the push rod 19 and once each revolution of the chain 14, the arm 22 will engage the rod 22 which happens to be at the right-hand end of the sign area in Figure 1 and moves the web A changing the one sign area to the next succeeding area, it being observed from an observation of Figure 6, that as the arm 22 reaches the left part of the housing and rides the semi-circular portion of its guide slot, it will leave the rod 27 that it has been pushing, leaving the web stationary as it continues its travel along the back of the housing and around again to the next rod 27, thus affording an interim for public observation of the exposed sign area.

An animated figure attachment is shown in Figures 8, 9 and 10 and it is desirable that such a figure be used in conjunction with a push rod 19a, the same serving the same capacity as the rod 19 in addition to supporting the figure. (See Figures 8 and 9.)

As can be seen in Figures 8, 9 and 10, the animated figure is generally referred to by numeral 36 and includes a painted or otherwise prepared plate 37 formed to represent a grotesque body and head. Rearwardly disposed pins 38, 39 are provided at the lower portion of the body plate 37 and swingable on these pins are legs 40 and 41, respectively.

A stub 42 projects rearwardly from the intermediate portion of the body plate 37 and has an opening therein receiving the upper portion of an extension 19a of the corresponding pusher rod 19. A swingable plate 43 is provided at the upper end of the extension 19a, this plate having upwardly disposed end portions from which extend swivel eyes 44, these eyes embracing the upper ends of leg-operating rods 45, 46, which extend down and are obliquely disposed and preferably welded to the backsides of the legs 40 and 41, respectively.

Underlying the figure 36, a shelf 8a has a channel therein in which are located two rows of blocks 47, 48, one row of blocks, namely, the row 47 being for the leg 40 and the row 48 for the leg 41. The blocks of the rows are staggered, and obviously as the Figure 36 is carried by the pusher rod 19 one leg will be caught by one of the blocks and held as the figure moves forwardly and the other leg swings forwardly to a position to be stopped by the next block of the adjacent row. It is preferable that the arms of the figure be diverged toward the web A so that it appears that the figure is actually pushing the web.

As shown in Figure 14, the sheet 29 which may be of some suitable fabric or stiffer material is perforated at its edge portions, with the perforations spaced equivalently to the snap fasteners 32, so that all that is required is the insertion of the sheet or panel 29 and the subsequent snapping of the fastener through the opening to retain the advertising medium definitely, although detachably, in place.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:

1. A changeable sign comprising an endless display web, an endless drive element, said web being provided with vertical disposed members, a drive arm extending from the drive element and being engageable successively with the vertically disposed members on the web and a figure carried by the arm.

2. A changeable sign comprising an endless display web, an endless drive element, said web being provided with vertically disposed members, a drive arm extending from the drive element and being engageable successively with the vertically disposed members on the web and a figure carried by the arm, said figure being provided with movable members adapted to be automatically operated.

3. A changeable sign comprising an endless display web, an endless drive element, said web being provided with vertically disposed members, a drive arm extending from the drive element and being engageable successively with the vertically disposed members on the web and a figure carried by the arm, said figure comprising a body carried by the drive arm, swingable legs on the body, and trip members against which the legs are adapted to strike and effect a walking motion of the legs.

4. A changeable sign comprising an endless web, an endless drive chain, driving means between the chain and the web, a member projecting from the chain, an animated figure supported by the member and structure against which the figure can strike to impart animation thereto.

5. A changeable sign comprising an endless web, an endless drive chain, driving means between the chain and the web, a member projecting from the chain, an animated figure supported by the member and structure against which the figure can strike to impart animation thereto, said animated figure including leg members having projecting portions, said structure being formed with a groove and upstanding members in the groove against which the projecting portions of the legs can strike and ride over to impart a walking motion to the figure.

6. A changeable sign comprising an endless web, an endless drive chain, driving means between the chain and the web, a member projecting from the chain, an animated figure supported by the member and structure against which the figure can strike to impart animation thereto, said structure having a pair of channels therein, said channels being provided with upstanding members therein, the upstanding members in one channel being offset with respect to the upstanding members in the other channel, said figure being provided with movable legs having depending portions adapted to strike against the upstanding members in the respective channels.

HERBERT A. GRAHAM.